United States Patent
Englander et al.

(10) Patent No.: US 9,221,398 B1
(45) Date of Patent: Dec. 29, 2015

(54) FENDER MOUNT ASSEMBLY HAVING BACKING PLATE

(75) Inventors: Benjamin Englander, Woodmere, NY (US); Julian Serer, Plainview, NY (US)

(73) Assignee: Rosco, Inc., Jamaica, NY (US)

( * ) Notice: Subject to any disclaimer, the term of this patent is extended or adjusted under 35 U.S.C. 154(b) by 6 days.

(21) Appl. No.: 13/195,380

(22) Filed: Aug. 1, 2011

Related U.S. Application Data (60) Provisional application No. 61/369,572, filed on Jul. 30, 2010.

(51) Int. Cl.
*B60R 1/06* (2006.01)

(52) U.S. Cl.
CPC *B60R 1/06* (2013.01); *B60R 1/0605* (2013.01)

(58) Field of Classification Search
USPC .............. 248/229.1, 229.14, 200, 205.1, 214, 248/226.11, 316.1, 316.8, 466, 475.1; 359/838, 842, 872, 879, 880
See application file for complete search history.

(56) References Cited

U.S. PATENT DOCUMENTS

| | | | |
|---|---|---|---|
| 2,315,260 A | * | 3/1943 | Lancaster ................. 74/490.15 |
| 2,860,546 A | * | 11/1958 | Bolser ............................ 248/477 |
| 3,081,057 A | | 3/1963 | Farnsworth |
| 3,142,469 A | | 7/1964 | Clemmer |
| 3,168,277 A | | 2/1965 | Stewart |
| 2,596,632 A | | 7/1966 | Whitehead |
| 3,259,349 A | | 7/1966 | Lee |
| 3,260,490 A | | 7/1966 | Trautner |
| 3,372,897 A | | 3/1968 | Lee |
| 3,395,883 A | | 8/1968 | Murgas |
| 3,415,481 A | | 12/1968 | Greenfield |
| 3,424,424 A | | 1/1969 | Kelly |
| 3,482,811 A | | 12/1969 | Zent |
| 3,501,122 A | | 3/1970 | Barker |
| 3,601,938 A | | 8/1971 | Loomis |
| 3,608,856 A | | 9/1971 | Hurley |
| 3,729,163 A | | 4/1973 | Cummins |
| 3,778,016 A | | 12/1973 | Gernhardt et al. |
| 3,831,896 A | | 8/1974 | Owens |
| 4,073,461 A | | 2/1978 | Lopez et al. |

(Continued)

FOREIGN PATENT DOCUMENTS

| | | |
|---|---|---|
| EP | 0094187 A2 | 11/1983 |
| FR | 2504872 | 11/1982 |
| JP | 41-1693 | 2/1941 |

OTHER PUBLICATIONS

Bogren, Scott "2001 Vehicle Showroom," Community Transportation, vol. 19, No. 2, pp. 16-35, Jan./Feb. 2001.

(Continued)

*Primary Examiner* — Alfred J Wujciak
(74) *Attorney, Agent, or Firm* — Strock & Strock & Lavan LLP (57) ABSTRACT

A mirror mounting assembly for mounting a mirror to a vehicle, includes a mounting bracket including a mirror pivot mechanism for pivotally mounting a mirror mounting arm carrying the mirror to the mirror mounting bracket, and a top support bracket configured to connect to a top side of a first structural portion. The assembly also includes a back support bracket configured to connect to at least one of the top support bracket and the top side of the structural portion of the vehicle, and configured to connect to the mounting bracket while being supported by at least one of the first structural portion and at least a second structural portion of the vehicle.

30 Claims, 11 Drawing Sheets

(56) References Cited

U.S. PATENT DOCUMENTS

| | | |
|---|---|---|
| 4,158,451 A | 6/1979 | Lukey |
| 4,187,702 A | 2/1980 | Benton |
| 4,218,036 A * | 8/1980 | Pitkanen ............ 248/478 |
| 4,368,868 A | 1/1983 | Urban |
| 4,441,682 A | 4/1984 | Su |
| 4,500,063 A | 2/1985 | Schmidt et al. |
| 4,512,634 A | 4/1985 | Stout |
| 4,830,326 A | 5/1989 | Schmidt et al. |
| 5,106,049 A | 4/1992 | Schmidt et al. |
| 5,116,013 A | 5/1992 | Malcolmson |
| 5,316,257 A | 5/1994 | Schmidt et al. |
| 5,433,417 A * | 7/1995 | Schmidt et al. ............ 248/487 |
| 6,361,178 B1 | 3/2002 | Lang et al. |
| 6,398,375 B1 | 6/2002 | Englander |
| 6,883,923 B2 | 4/2005 | Englander |
| 6,962,420 B2 | 11/2005 | Branham |
| 7,350,931 B1 * | 4/2008 | Peterson et al. ............ 359/841 |
| 8,333,479 B2 | 12/2012 | Englander |
| 2010/0226026 A1 | 9/2010 | Englander |

OTHER PUBLICATIONS

"Vehicle Guide 2002," Community Transportation, Medical Issue, vol. 20, No, 1, pp. 34-37. 2002.

"State Contacts," Community Transportation, vol. 20, No. 2, p. 47. Spring 2002.

\* cited by examiner

FENDER MOUNT ASSEMBLY HAVING BACKING PLATE

RELATED APPLICATIONS

This application claims priority to U.S. Provisional Application No. 61/369,572, filed on Jul. 30, 2010, entitled: Fender Mount Assembly Having Backing Plate, and which is hereby incorporated by reference.

BACKGROUND OF THE INVENTION

1. Field of the Invention

The present invention generally relates to a mounting assembly for mounting a mirror to a motor vehicle.

2. Description of the Background Art

Side view mirrors which are used on buses and trucks are evidenced by U.S. Pat. Nos. 3,395,883, 4,368,868, 4,500,063, 4,512,634, 5,106,049 and 5,316,257, the contents of which are incorporated by reference herein.

Side view mirrors may be mounted so that the driver can see toward the rear of the vehicle. This is generally accomplished by mounting the mirror on the side of the vehicle, as well as laterally projecting from the vehicle. This type of mounting includes elongated mounting arms which we have determined increase the vibration of the mirror. Furthermore, mounting arms are generally fixed to the body panels of the vehicle which we have determined also vibrate during operation of the vehicle and thus leads to an even greater vibration of the mirror.

The mounting of the mirror mounting assembly to the body panels requires drilling holes in the body panels. These holes, especially those made in the fender of the vehicle in the vicinity of the wheel well, may expose the bare metal of the body panel to moisture which may lead to rust and corrosion developing in the area of the mounting hole. Due to the relatively thin metal used in constructing motor vehicles, in a very short period of time the area around the mounting hole becomes rusted and is no longer structurally sound and thus is no longer able to adequately hold the mounting assembly. This results in having to either repair the body panel and remount the mounting assembly or move the mounting assembly to another location which entails drilling new holes in the body panel. This in turn leaves the body panel in the area of the previously-drilled holes to further deteriorate.

Detachable mirrors are also known, as evidenced by U.S. Pat. No. 3,395,883. This mounting utilizes a clamp that engages around the lip of the wheel well of the vehicle and feet that contact the inner face of the fender edge forming the engine compartment. The feet are held in place by tension generated by a rubber element that extends between the feet at the engine compartment and the clamp at the wheel well. The problem with this type of device is that it is easily removed and is thus subject to theft. Furthermore, since the mounting arms are mounted to the body panel there is also the problem of vibrations being amplified by the mounting arms.

SUMMARY OF THE INVENTION

Various embodiments for mirror mount assemblies for supporting a mirror are provided. In addition, various alternative methods of installing mirror mount assemblies are also provided.

In some embodiments, a mirror mounting assembly for mounting a mirror to a vehicle includes a mounting bracket including a mirror pivot mechanism for pivotally mounting a mirror mounting arm carrying the mirror to the mirror mounting bracket, a first connection area, and a second connection area. The assembly also includes a top support bracket having a third connection area configured to connect the top support bracket to a top side of a structural portion of the vehicle, and a fourth connection area configured to connect to the first connection area of the mounting bracket. In addition, a back support bracket is provided comprising a fifth connection area configured to connect to at least one of the top support bracket and the top side of the structural portion of the vehicle, and sixth connection area configured to connect to the mounting bracket, and at least one connection device configured to connect the second connection area to the sixth connection area.

In some embodiments, the mounting bracket further comprises a front portion, a left side wall, a right side wall, a top wall, and a bottom wall, wherein the front portion, side walls, top wall and bottom wall together form a concave back portion, and wherein the concave back portion is generally shaped to the contour of a portion of a fender of the vehicle.

In some embodiments, the top wall of the mounting bracket comprises the first connection area, and wherein the front portion comprises the mirror pivot mechanism.

In some embodiments, the third connection area of the top support bracket has a substantially elongated shape, a proximal end and a distal end, and wherein the third connection area comprises a proximal end aperture and a distal end aperture.

In some embodiments, the proximal end aperture and the distal end aperture are appropriately spaced to generally align with and are fastenable to existing fasteners on the top side of the frame.

In some embodiments, the fourth connection area comprises a substantially z-shaped flange extending from a side of the third connection area in a direction of an outer side of the structural portion of the vehicle, wherein the z-shaped flange is positioned and configured so as to be insertable into the back portion of the mounting bracket and wherein the fourth connection area is fastenable to an underside of the top wall at the first connection area.

In some embodiments, a back support bracket conforms to a substantially inverted L-shape, and the fifth connection area of the back support plate comprises a top plate positioned to be alignable and fastenable with at least one of the third connection area of the top support bracket and another location along the top side of the structural portion of the vehicle.

In some embodiments, a sixth connection area of the back support bracket comprises a back plate that extends downward from the top plate, along an inner side of the structural portion of the vehicle, for the at least one connection device to connect the second connection area of the mounting bracket to the sixth connection area of the back support bracket.

In some embodiments, a mounting bracket, the top support bracket, and the back support bracket are adapted to fasten substantially around a portion of the frame of the vehicle.

In some embodiments, a mounting bracket comprises a substantially right-angled trapezoidal shape, and wherein the bottom wall of the mounting bracket substantially conforms to a wheelbase of the fender of the vehicle.

In some embodiments, at least one fastener is provided for connecting the first connection area to the fourth connection area.

In some embodiments, the assembly further comprises at least one support shaft of sufficient length to be placed between the mounting bracket and the back support bracket or between the mounting bracket and a side of the structural portion of the vehicle.

In some embodiments, at least one connection device connects the second connection area to the sixth connection area at least one of beneath the structural portion of the vehicle, supported by the structural portion of the vehicle, and through a bore within the structural portion of the vehicle.

In some embodiments, the top support bracket and the back support bracket are at least one of integral, welded and permanently connected to form one contiguous support bracket.

In some embodiments, a mirror mounting assembly for mounting a mirror to a vehicle, includes a mounting bracket including a mirror pivot mechanism for pivotally mounting a mirror mounting arm carrying the mirror to the mirror mounting bracket, at least one first connection device and a top support bracket configured to connect to a top side of a first structural portion under the hood of the vehicle and to the mounting bracket using the at least one first connection device. The assembly also includes at least one second connection device, and a back support bracket configured to connect to at least one of the top support bracket and the top side of the structural portion of the vehicle. The back support bracket is configured to connect to the mounting bracket using the at least one second connection device, and the back support plate being supported by a second structural portion of the vehicle.

In some embodiments, a mirror mounting assembly for mounting a mirror to a vehicle includes a mounting bracket including a mirror pivot mechanism for pivotally mounting a mirror mounting arm carrying the mirror to the mirror mounting bracket, and a top support bracket configured to connect to a top side of a first structural portion. The assembly also includes a back support bracket configured to connect to at least one of the top support bracket and the top side of the structural portion of the vehicle, and configured to connect to the mounting bracket while being supported by at least one of the first structural portion and at least a second structural portion of the vehicle.

In some embodiments, a mirror mounting assembly for mounting a mirror to a vehicle includes a mounting bracket that is mounted as far forward on the vehicle as possible to help the driver see toward the rear of the vehicle. In some embodiments, the mirror mounting assembly is placed closer to the front of the vehicle which allows in some embodiments:

a. Seeing the right hand (RH) mirror through the windshield rather than a door window; and/or
 b. An unobstructed field of vision (see a.) that would be otherwise difficult to accomplish with, for example, a door-mount mirror.

BRIEF DESCRIPTION OF THE DRAWINGS

FIG. 4 is a front view of a mounting bracket illustrating areas for fastening mounting bracket to a vehicle according to some embodiments of the invention;

DETAILED DESCRIPTION OF THE INVENTION

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described process may be altered so that certain processes are conducted in parallel or independent, with other processes, to the extent that the processes are not dependent upon each other. Thus, the specific order of steps described herein is not to be considered implying a specific sequence of steps to perform the process. In alternative embodiments, one or more process steps may be implemented by a user assisted process and/or manually. Other alterations or modifications of the above processes are also contemplated. For example, further insubstantial approximations of the process and/or algorithms are also considered within the scope of the processes described herein.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

Various embodiments for mirror mount assemblies for supporting a mirror are provided. In addition, various alternative methods of installing mirror mount assemblies are also provided.

Figure 1:
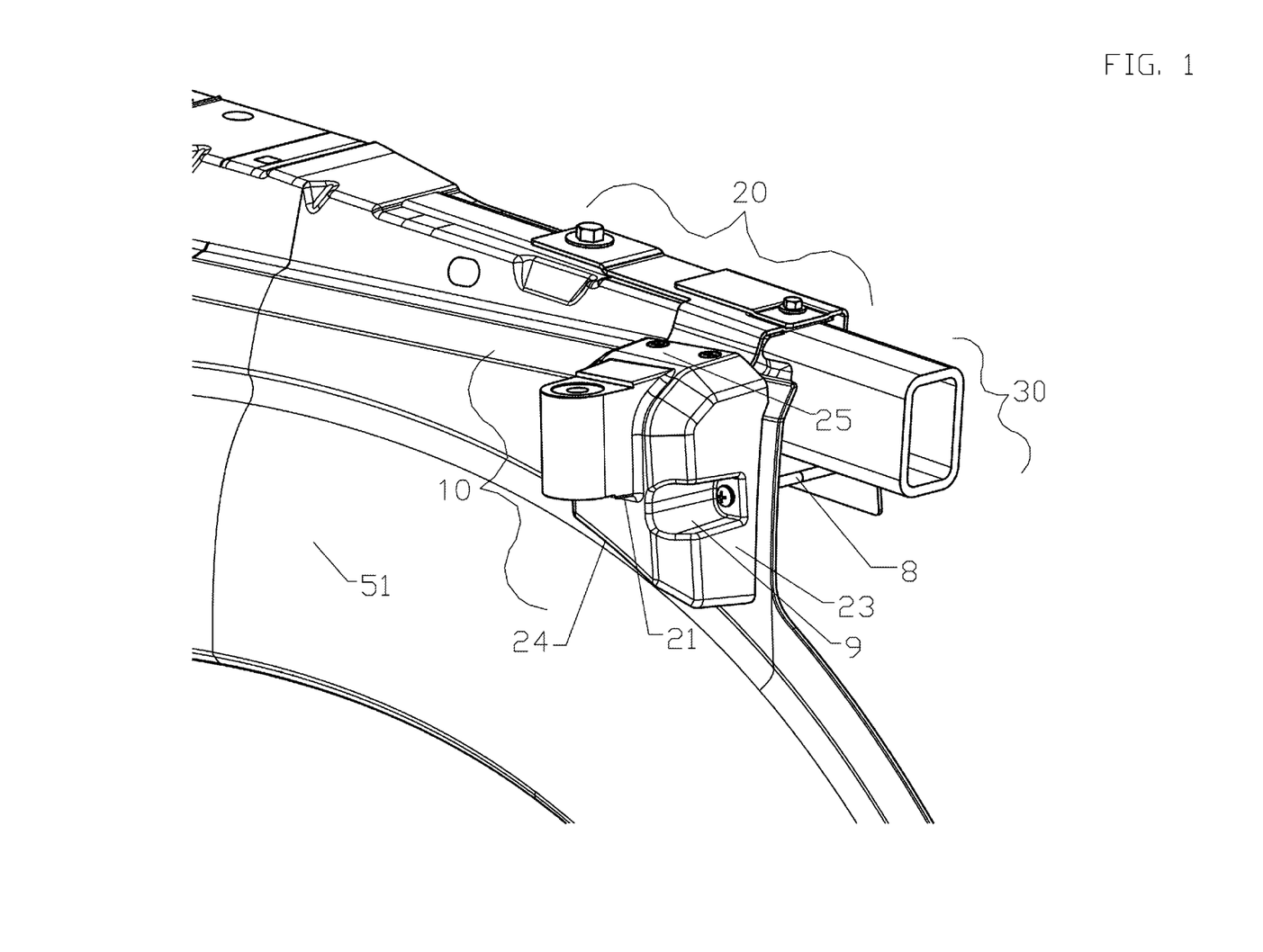
FIG. 1 is a diagram of a first exemplary embodiment of the mirror mounting assembly according to some embodiments of the invention.

As can be seen in FIG. 1, a first exemplary embodiment of the inventive mirror mounting assembly comprises a mounting bracket 10, a top support bracket 20, a back support bracket 30 and at least one connection device 8. Mounting bracket 10 has a front portion 21, a bottom wall 24, a top wall 25, a left wall 22 (see also FIG. 3), and a right wall 23. The front portion 21 can comprise a mirror pivot mechanism 7. The mirror pivot mechanism 7 is attachable to, and supportive of, a mirror support arm (see also FIG. 11). Alternative mirror attachment mechanisms may also be possible, including, for example, stationary mirror attachments, mechanical/motorized attachments, and the like. Additionally, the mirror pivot mechanism 7 can be integral with the front portion 21, permanently welded to the front portion 21 or attached to the front portion 21 via standard connections that may be permanent or temporary.

In one alternative embodiment of the invention, the bottom wall 24 of the mounting bracket 10 is shaped to substantially conform to a shape of a wheelbase 51 of the fender 50 of a vehicle. As the mirror mounting assembly may be mounted, for example, to the fender 50 in a location forward of center above the wheelbase 51, the side wall closer to the front of the vehicle may be longer from top to bottom than the side wall closer to the rear of the vehicle. Therefore, mounting bracket 10 may comprise in some embodiments a substantially right-angled trapezoidal shape. It is to be understood that other shapes are also possible and one consideration for the approximate shape of mounting bracket 10 is conformity with the fender 50 and/or wheelbase 51 of the vehicle to which the mirror mounting assembly is attached.

The four walls 22, 23, 24, and 25 and front portion 21 of mounting bracket 10 together form a concave shaped backing (not shown) when viewed from behind. In some embodiments, the four walls 22, 23, 24, and 25 are shaped so as to allow the back of mounting bracket 10 to substantially conform to the contour of fender 50. As such, one or more walls, or portions of one or more walls (for example top wall 25) may extend further away from front portion 21 than other walls, in order to compensate for any sloping shapes, curvatures and/or indents in fender 50.

In some embodiments, mounting bracket 10 has a concave shaped backing. In alternative embodiments, mounting bracket 10 can have either a sixth back wall, alternative shaped backing, and/or the entire mounting bracket 10 can be of a substantially solid form with no concavity. Additionally, while mounting bracket 10 has four walls and a front portion, in some alternative embodiments, mounting bracket 10 may be constructed of one contiguous piece of die cast aluminum. Alternatively, mounting bracket 10 can be made of sand cast aluminum or any other durable material strong enough to properly support a mirror and mirror support arm.

Figure 2:
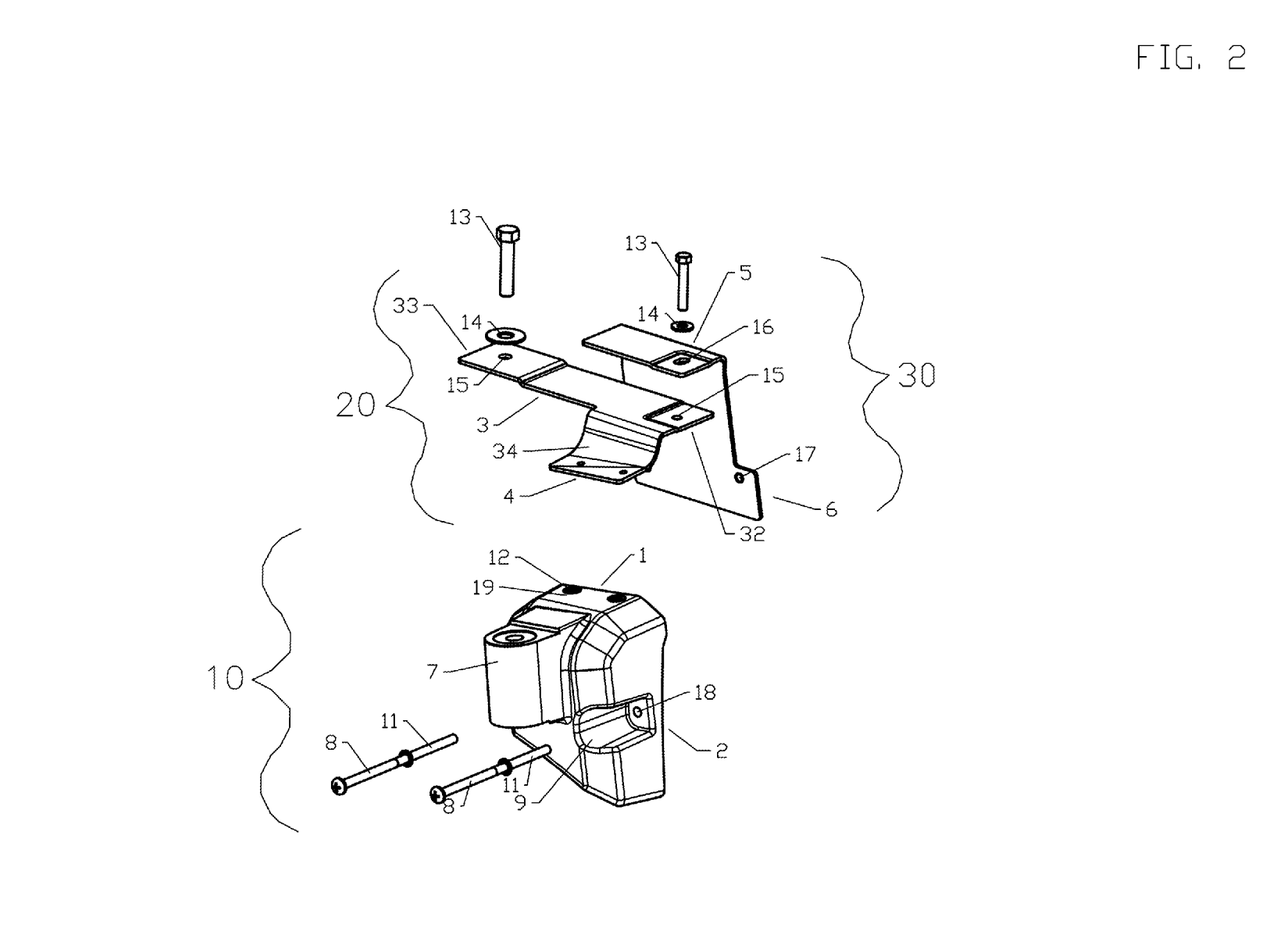
FIG. 2 is an exploded diagram of the mirror mounting assembly according to some embodiments of the invention.

As can be seen in FIG. 2, mounting bracket 10 further comprises at least two separate areas for fastening mounting bracket 10 to fender 50: a first connection area 1 and a second connection area 2. First connection area 1 is located at the top wall 25 of mounting bracket 10, and includes, for example, at least two downward-facing apertures 12 configured to receive fasteners 19 and to be fastenable to a portion of top support bracket 20. In alternative embodiments, more than two apertures or less than two apertures may also be used. Second connection area 2 comprises at least one back-facing aperture 18, which may be located along a depression 9 within at least one of the left side wall 22 and right side wall 23. In some embodiments, each side wall comprises a depression 9 and associated back-facing aperture 18. Alternatively or additionally, a single or multiple depressions and associated back-facing apertures similar to depression 9 and back-facing aperture 18 may be integral with the bottom wall 24 for alternative/added support. In alternative embodiments, rather than back-facing apertures 18 being located in depressions 9 in side walls 22 and 23, apertures 18 may alternatively be located in tabs or flanges extending out from side walls 22 and 23 or bottom wall 24. Additionally, while the two depressions 9 may be formed during the die casting of mounting bracket 10, they may alternatively be formed by indenting or depressing the walls by force to form depressions 9 depending on the material used.

Figure 3:
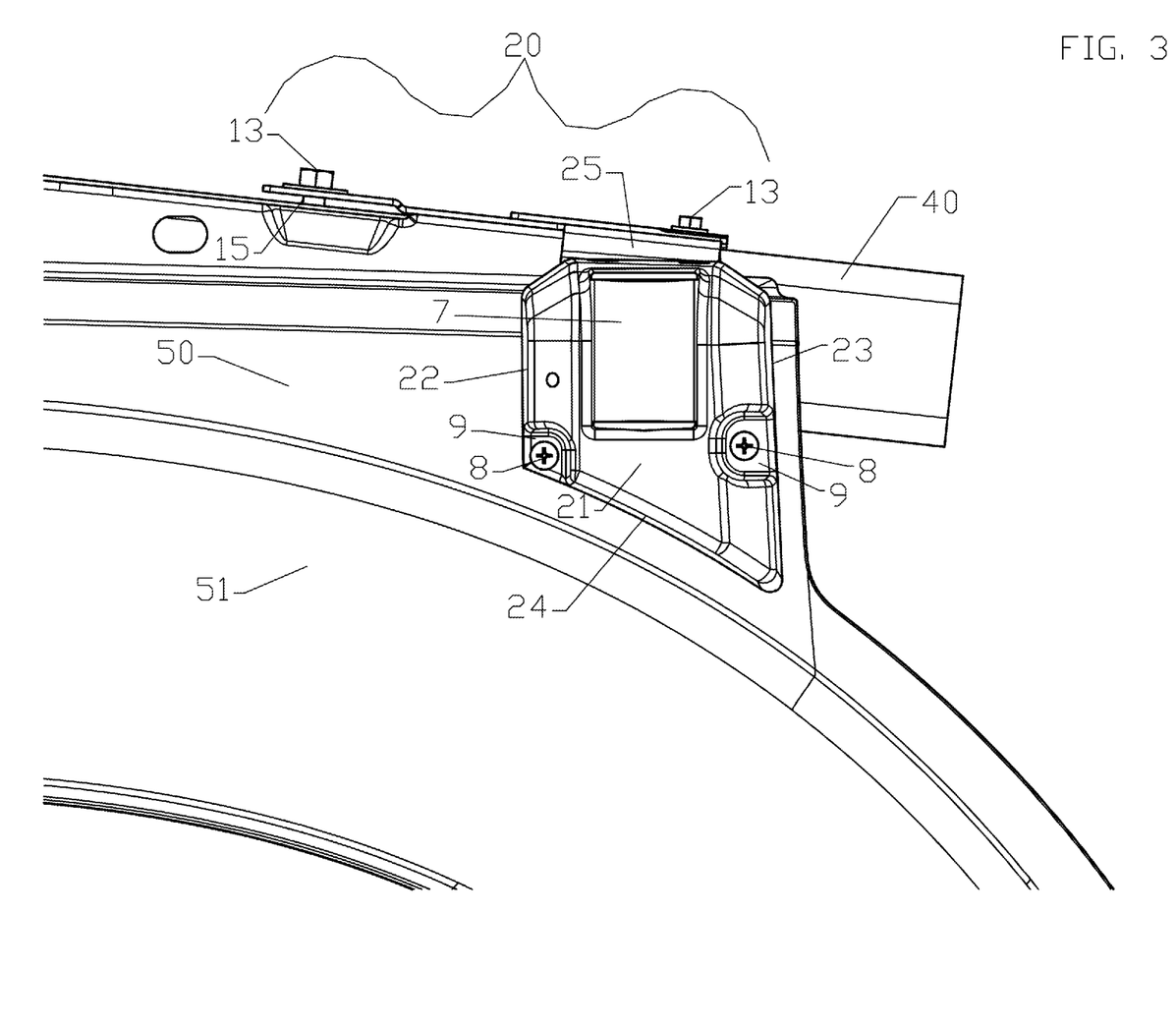
FIG. 3 is a side view of the mirror mounting assembly according to some embodiments of the invention.
Figure 4:
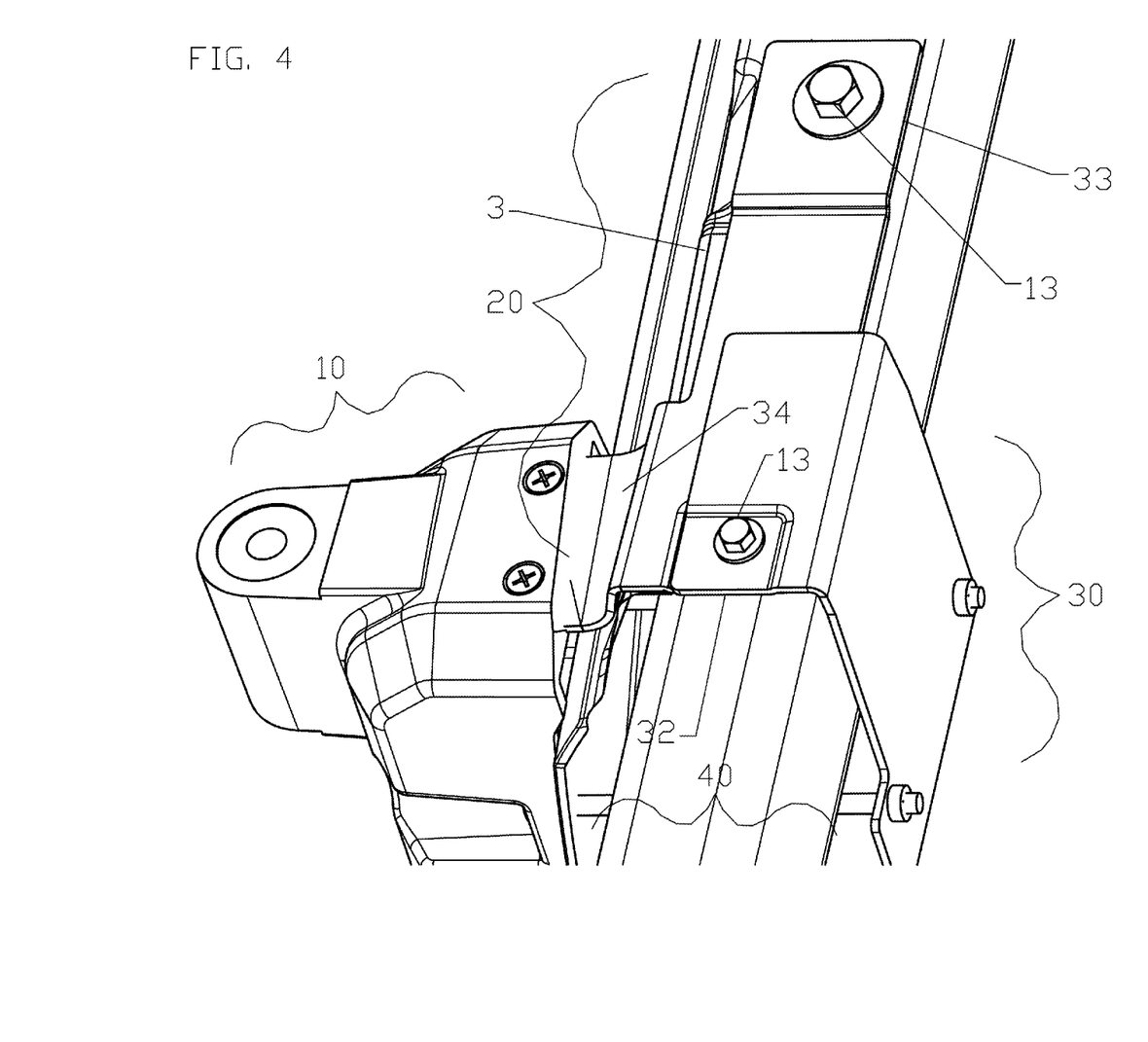
FIG. 4 is a top view of a mounting bracket illustrating areas for fastening mounting bracket to a vehicle according to some embodiments of the invention

As illustrated in, for example, FIG. 2 and/or FIG. 4, in a exemplary embodiment, top support bracket 20 has a substantially elongated shape, a proximal end 32, a distal end 33, and flange 34 extending laterally and downward from top support bracket 20. The elongated shape of top support bracket 20 comprises a third connection area 3. Third connection area 3 may include, for example, one or more apertures 15, such as one at proximal end 32 and one at distal end 33. As can be seen in FIG. 3, the proximal and distal end apertures 15 are appropriately spaced to generally align with and be fastenable to either existing fasteners 13 on the top side of the frame 40 of the vehicle and/or other fasteners that may be used to connect to the top side of frame 40. Additional and/or fewer alternative apertures can be optionally included along third connection area 3 to optimize connection of top mounting bracket 20 to frame 40. Likewise, other attachment devices are also possible, such as the introduction of additional fasteners not previously fastened to frame 40, and/or welding top support bracket directly to frame 40.

Figure 5:
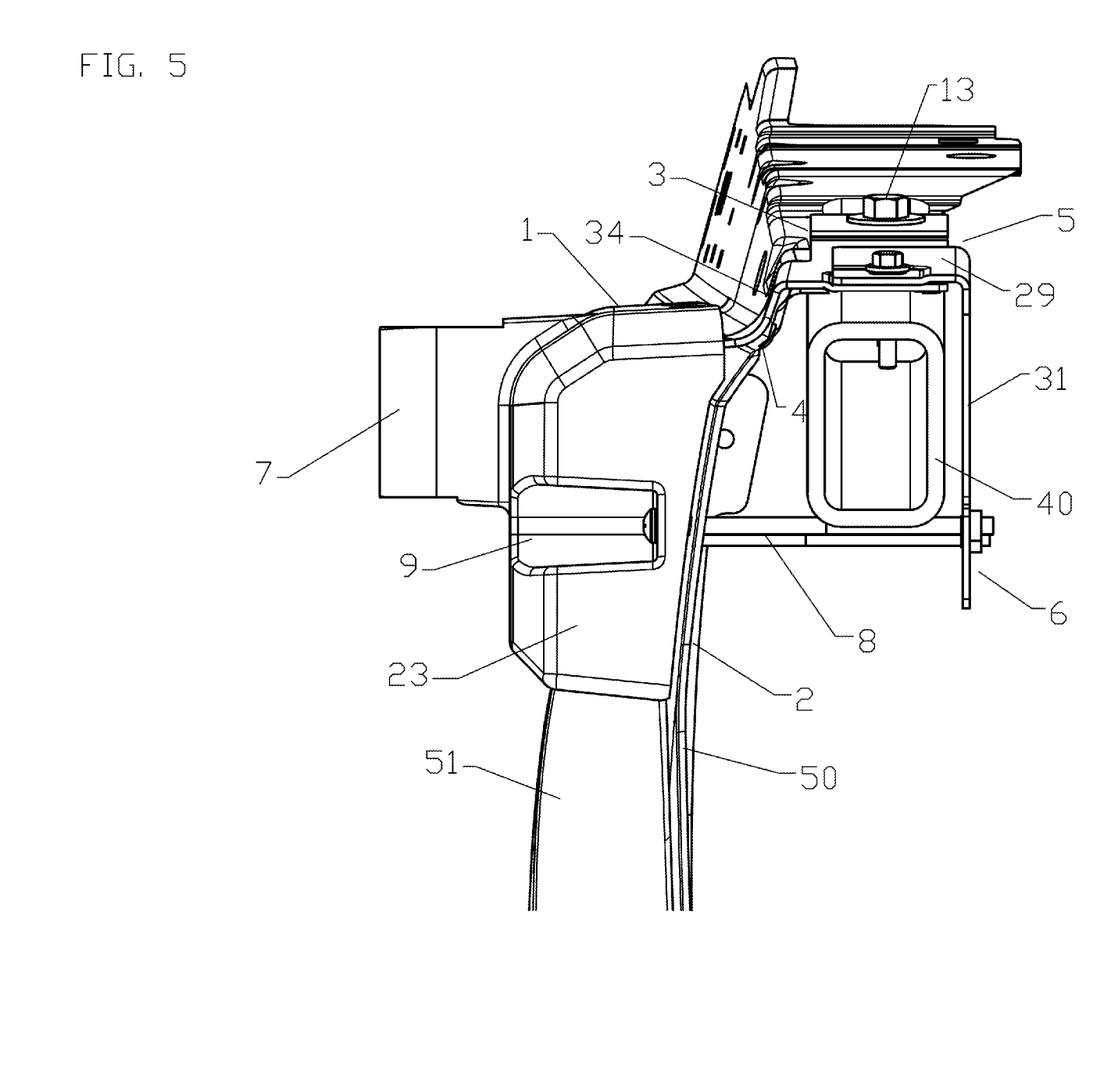
FIG. 5 is a front view of a mounting bracket illustrating areas for fastening mounting bracket to a vehicle according to some embodiments of the invention.

Flange 34 of top support bracket 20 extends substantially from the proximal end 32 of third connection area 3 in the direction of an outer side of the structural portion of the vehicle, and toward wheelbase 51. Flange 34 may alternatively extend from any portion of third connection area 3 that enables proper fastening of third connection area 3 to frame 40 while also allowing for proper connection to mounting bracket 10. In further alternative embodiments, flange 34 may be shaped as a Z or S to facilitate connection to bracket 10 and/or back support bracket 30. In alternative embodiments, additional flanges may be employed to facilitate the connection to flange 34 to bracket 10 and/or back support bracket 30 and/or flange 34, bracket 10 and/or back support bracket 30 may include additional sections to facilitate a stable connection. As can be seen in FIG. 2 and FIG. 5, the lower portion of flange 34 comprises a fourth connection area 4, which, in some embodiments, comprises one or more apertures configured to receive fasteners 19 and to be fastenable to first connection area 1 of mounting bracket 10. Flange 34 may be positioned and/or configured so as to be at least partially insertable into the concave backing of mounting bracket 10, wherein a fourth connection area 4 may be alignable with, and fastenable to, first connection area 1 at an underside of top wall 25.

Figure 6:
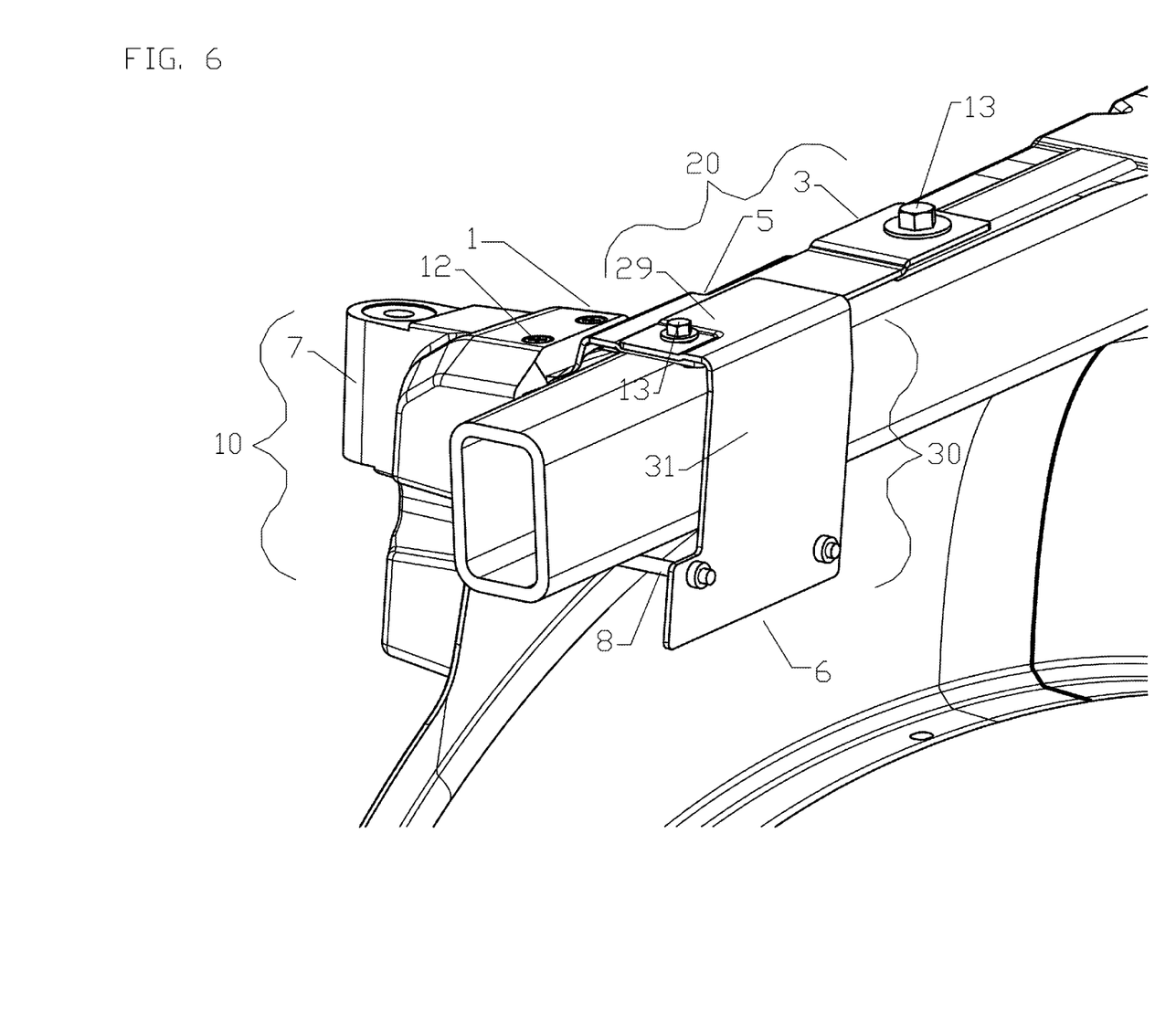
FIG. 6 is a view of a mounting bracket illustrating areas for fastening mounting bracket to a vehicle according to some embodiments of the invention.

In some embodiments, as can be seen in FIG. 5 and FIG. 6, back support bracket 30 comprises a substantially horizontally-oriented top plate 29 and a substantially vertically-oriented back plate 31. In some embodiments, top plate 29 and back plate 31 together conform to a substantially inverted L-shape. In alternative embodiments, top plate 29 and back plate 31 may form other shapes, such as a V, rectangle and the like. Top plate 29 comprises a fifth connection area 5 which includes at least one aperture 16 (as seen in FIG. 2) and is positioned to be alignable and fastenable, along with third connection area 3 of top support bracket 20, to frame 40. Fifth connection area 5 may be configured to be connectable with third connection area 3 using existing fasteners 13 or by any other appropriate means. In alternative embodiments, third connection area 3 and fifth connection area 5 may be fastened above or below one another, and optionally both fastened to frame 40. In other alternative embodiments, fifth connection area 5 may be configured to connect to another location along the top side of the structural portion of frame 40, while not connecting directly to third connection area 3.

Figure 7:
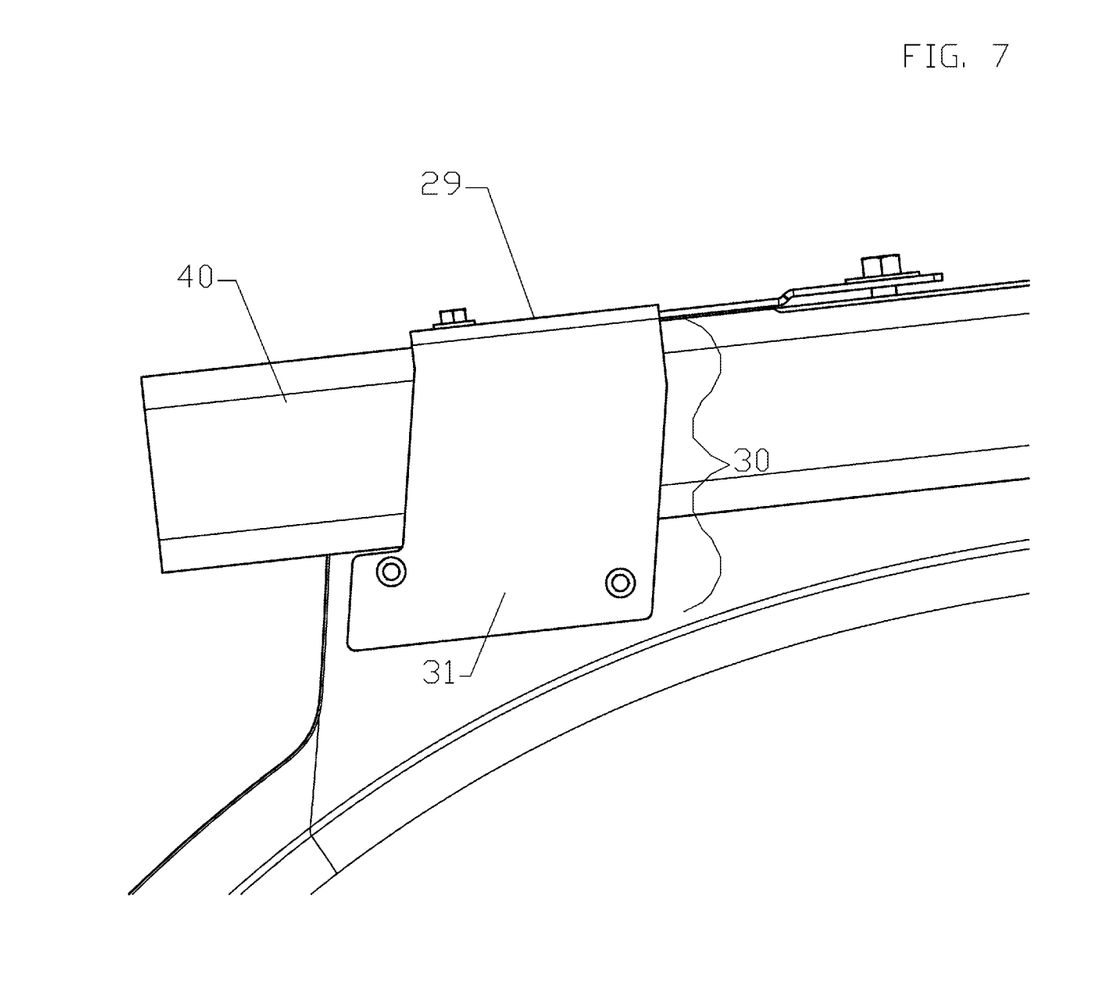
FIG. 7 is a side view of a mounting bracket illustrating areas for fastening mounting bracket to a vehicle according to some embodiments of the invention.

As can be seen in FIG. 6 and FIG. 7, in some embodiments, back plate 31 extends downward from an end of top plate 29, along an inner side of the structural portion of the vehicle, when top plate 29 is fastened to frame 40 or third connection area 3. Back plate 31 may include a sixth connection area 6 which may optionally be configured to substantially align with second connection area 2 of mounting bracket 10 when top plate 29 is fastened to either top support bracket 20 or frame 40, and when mounting bracket 10 is fastened to top support bracket 20. Therefore, depending on the configuration of mounting bracket 10 and the exact location of second connection area 2, back plate 31 may comprise any shape that allows for proper alignment of second connection area 2 and sixth connection area 6.

In some embodiments, top support bracket 20 and back support bracket 30 represent two distinct bracket elements. In alternative embodiments, top support bracket 20 and back support bracket 30 can represent two parts of one contiguous bracket or two brackets that have been welded or otherwise permanently fastened together. In alternative embodiments, additional flanges may be employed to facilitate the connection to flange 34 to bracket 10 and/or back support bracket 30 and/or flange 34, bracket 10 and/or back support bracket 30 may include additional sections to facilitate a stable connection. In alternative embodiments, different support areas or sections of the vehicle that provide support and/or stability, such as structural portions of the vehicle within the engine bay of the vehicle, below the hood of the vehicle and/or other structural sections/supports of the vehicle, including structural supports providing support to the body of the vehicle may be employed to facilitate the connection of bracket 10 and/or back support bracket 30 to facilitate a stable connection. Also, in alternative embodiments, top support bracket 20 and back support bracket 30 can be made of steal, aluminum or any other rigid or semi-rigid material strong enough and durable enough to provide support to mounting bracket 10.

In some embodiments, as illustrated in FIG. 5, connection device 8 comprises an elongated fastening device, such as a screw, adapted to connect second connection area 2 with sixth connection area 6. Alternative connection devices may include a hook, nail, wire, rod or any other device adapted to connect mounting bracket 10 to back support bracket 30. Connection device 8 may be adapted to be fastened between mounting bracket 10 and support bracket 30 either below a structural portion of frame 40 or through a bore, such as bore 41, passing through a structural portion of frame 40. In some embodiments, mounting bracket 10, top support bracket 20, back support bracket 30 and connection device 8 are adapted to fasten together substantially around a portion of the frame of the vehicle, such as frame 40.

Figure 8:
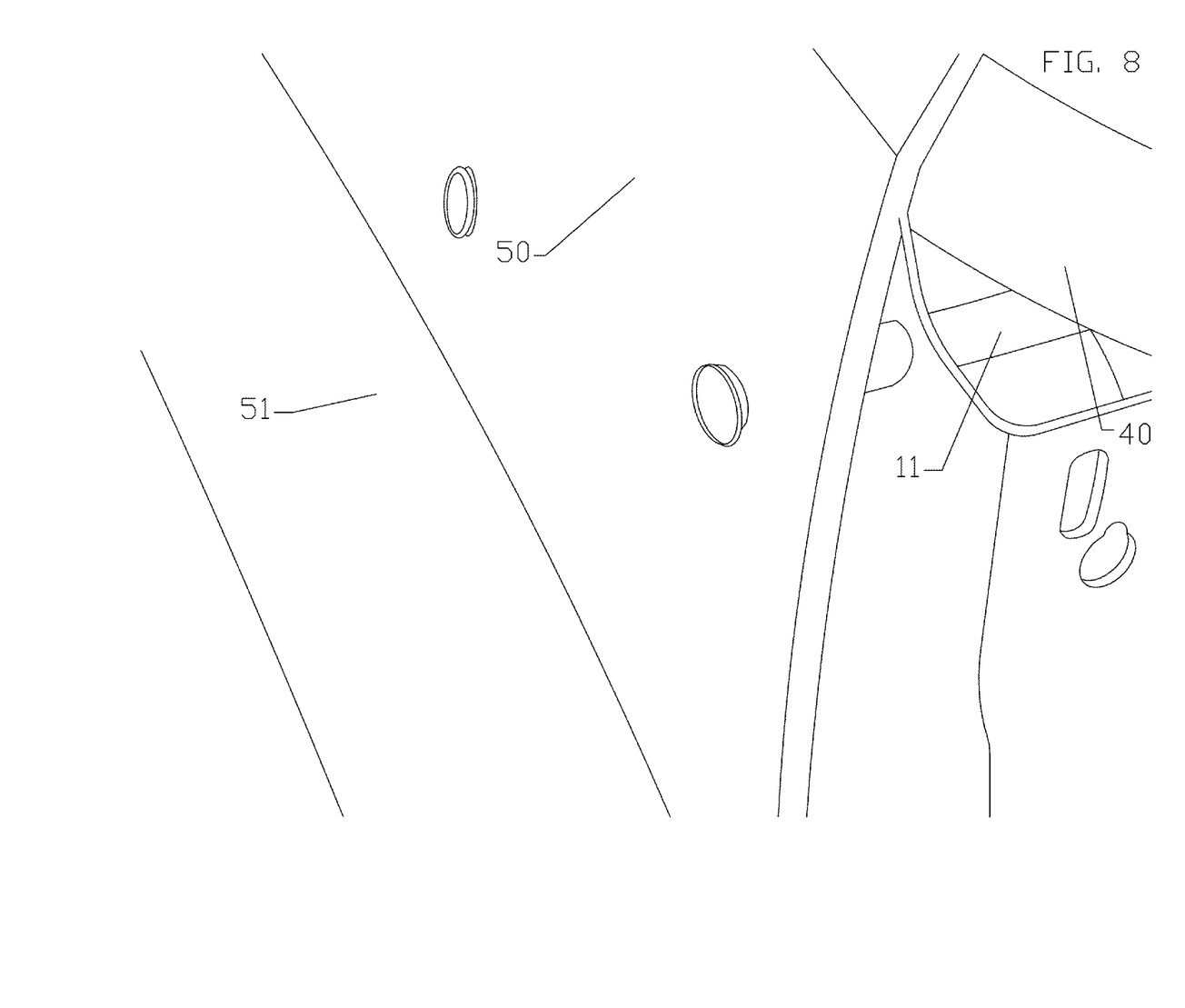
FIG. 8 is a view of a mounting bracket illustrating areas for fastening mounting bracket to a vehicle from the interior of the vehicle according to some embodiments of the invention.
Figure 9:
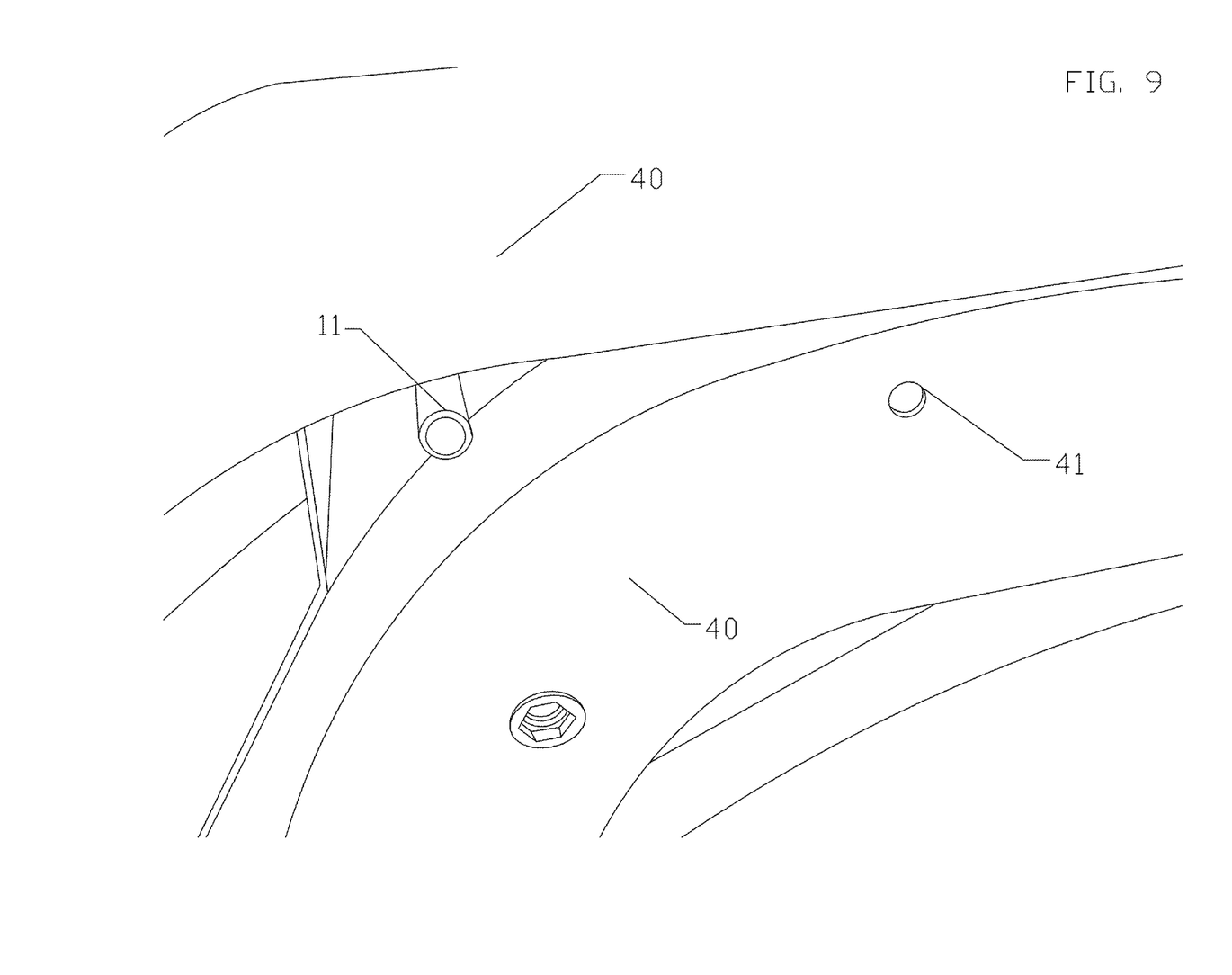
FIG. 9 is a view of a mounting bracket illustrating areas for fastening mounting bracket to a vehicle from the interior of the vehicle according to some embodiments of the invention.

In alternative embodiments, each connection device 8 may be coupled with a support shaft or tube 11 to provide additional support and strength to connection device 8 and the mirror mount assembly. In some embodiments, support shaft 11 can comprise a tube having a hollow cylindrical shape of sufficient diameter for connection device 8 to be passed through it, and sufficient length to provide additional support and strength. Mounting bracket 10 may be mounted in a location where connection device 8 may unobstructedly connect second connection area 2 and sixth connection area 6 beneath a structural portion of frame 40, in which case support shaft 8 may be a length approximately equivalent to the distance between second connection area 2 of mounting bracket 10 and sixth connection area 6 of back support bracket 30. Alternatively, as can be seen in FIG. 8 and FIG. 9, mounting bracket 10 may be mounted in a location where connection device 8 cannot unobstructedly connect second connection area 2 and sixth connection area 6 beneath a structural portion of frame 40, and instead passes through bore 41 in the structural portion of frame 40 to connect second connection area 2 and sixth connection area 6. In this case, the length of support shaft 11 may be, for example, equivalent to the distance between the mounting bracket and an outer side of the structural portion of frame 40. Support shaft 11 may provide additional support to mounting bracket 10.

In some embodiments, depending on the particular location where the mirror mount assembly is mounted, the mirror mount assembly may include multiple support shafts 11 of varying lengths. For example, a first connection device 8 may pass below a structural portion of frame 40, thus requiring a longer support shaft 11, while a second connection device 8 might pass through bore 41 in the structural portion of frame 40, thus requiring a shorter support shaft 11.

In some embodiments, a tube or shaft, such as support shaft 11 may comprise any form and/or material through which connection device 8 may pass which provides additional support. For example, support shaft 11 may comprise a solid structure or material, such as a rod, dowel, brace, rubber stopper, hardening foam, acrylic filler, rubber cement etc., through which connection device 8 is drilled at the time of connection, or which is formed around or mounted coextensive with connection device 8 after fastening.

In alternative embodiments, one or more of the six connection areas may either have preformed apertures, apertures created during connection and/or a combination of preformed and non-preformed apertures. Additionally, preformed apertures may be threaded and/or reinforced with nuts that may be detachable or welded in place to fortify the apertures and to receive appropriately sized fasteners. Alternative embodiments may also include a buffer, such as a metallic or rubberized plate or section, placed between connection areas to provide additional support and strength to the mirror mount assembly. Similarly, fasteners 13 and/or connection devices 8, may including washers, such as washer 14, and/or spacers for added strength and stability. Any and/or all of these buffers, washers and spacers may be permanently or temporarily attached.

Figure 10:
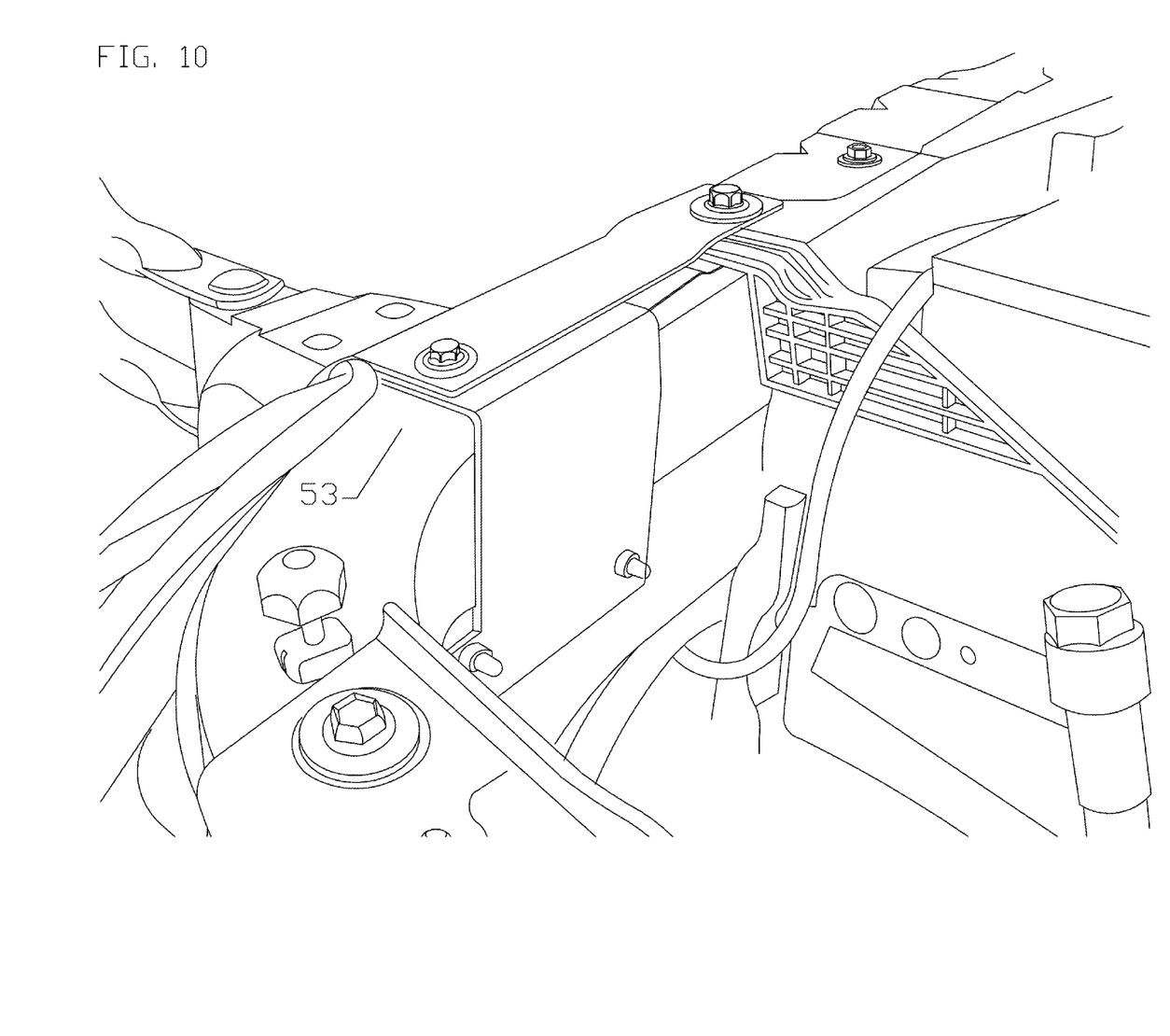
FIG. 10 is a view of a mounting bracket illustrating areas for fastening mounting bracket to a vehicle according to some embodiments of the invention.

In alternative embodiments, a method of mounting a mirror mount assembly to a vehicle is provided. In a first exemplary method, an installer opens the hood 52 of a vehicle to the open position or removes the hood 52 from the vehicle, connects first connection area 1 of mounting bracket 10 to fourth connection area 4 of top support bracket 20 and places mounting bracket 10 so that mounting bracket 10 engages, and is in conformance with, at least a portion of a shape of fender 50 of the vehicle. Third connection area 3 of top support bracket 20 may be substantially coextensive with a first mounting section 53 of a structural portion of the vehicle as seen in FIG. 10. The method also includes placing top support bracket 20 so that third connection area 3 remains substantially coextensive with at least first mounting section 53 of the structural portion of the vehicle and so fourth connection area 4 is substantially near an outer side of the structural portion of the vehicle. The method further includes placing back support bracket 30 so that fifth connection area 5 is substantially coextensive with third connection area 3, and so sixth connection area 6 is substantially at an inner side of the structural portion of the vehicle. The method also includes fastening third connection area 3 and fifth connection area 5 with the at least first mounting section 53 of the structural portion of the vehicle, and connecting second connection area 2 to sixth connection area 6 using the at least one connection device 8.

An alternative method includes opening the hood 52 of a vehicle to the open position or removing the hood 52 from the vehicle, and placing top support bracket 20 so that third connection area 3 is substantially coextensive with at least the first mounting section 53 of a structural portion of the vehicle and so fourth connection area 4 is substantially near an outer side of the structural portion of the vehicle. The method also includes placing back support bracket 30 so that fifth connection area 5 is substantially coextensive with third connection area 3, and so sixth connection area 6 is substantially at an inner side of the structural portion of the vehicle, and fastening third connection area 3 and fifth connection area 5 with the at least first mounting section 53 of the structural portion of the vehicle. The method also includes placing mounting bracket 10 so that mounting bracket 10 engages, and is in conformance with, at least a portion of a shape of fender 50 of the vehicle, while the first connection area 1 of mounting bracket 10 is substantially coextensive with fourth connection area 4. The method further includes connecting first connection area 1 to fourth connection area 4, and connecting second connection area 2 to sixth connection area 6 using the at least one connection device 8.

It is of course to be understood that any given steps recited in any methods described herein can be sequential, non-sequential and/or sequence independent steps. For example, in any contemplated method of installing the mirror mount assembly, the step of connecting first connection area 1 of mounting bracket 10 and fourth connection area 4 of top support bracket 20 can be performed during factory assembly or at any point prior to installation.

Figure 11:
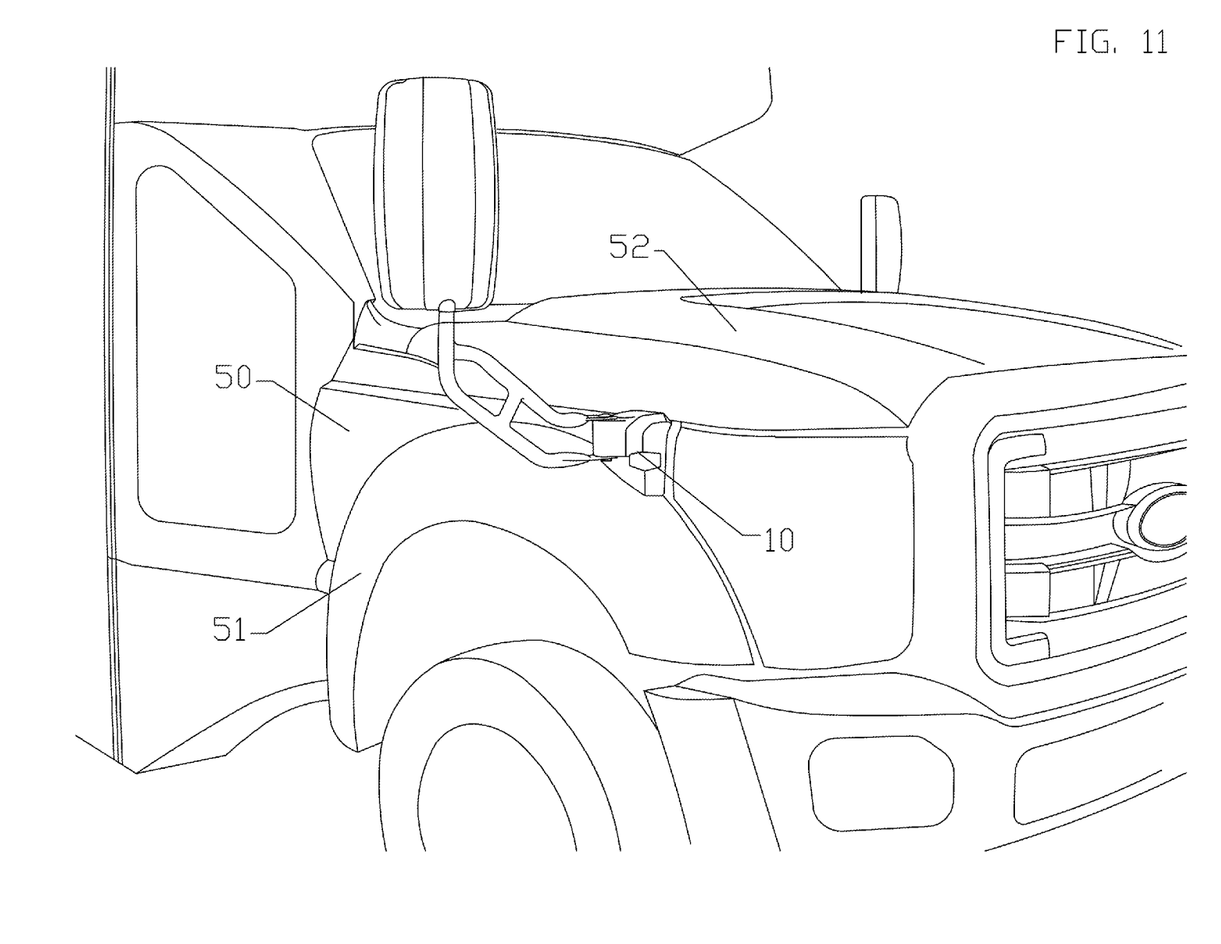
FIG. 11 is a top view of a mounting bracket illustrating areas for fastening mounting bracket to a vehicle according to some embodiments of the invention.

Alternative embodiments of the above methods can include at least any combination of the following additional steps: installing support shafts 11 as described above; pre-drilling required apertures or drilling during installation; assuring that hood 52 closes properly of the engine bay when the mirror mount assembly is properly installed (as seen in FIG. 11; and welding or otherwise connecting any of the aforementioned connection area to each other and/or to frame 40 of the vehicle.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

For example, the specific sequence of the above described process may be altered so that certain processes are conducted in parallel or independent, with other processes, to the extent that the processes are not dependent upon each other. Thus, the specific order of steps described herein are not to be considered implying a specific sequence of steps to perform the above described process. Other alterations or modifications of the above processes are also contemplated. For example, further insubstantial approximations of the above equations are also considered within the scope of the processes described herein.

What is claimed is:

1. A mirror mounting assembly for mounting a mirror to a vehicle, comprising:
   a mounting bracket including a mirror pivot mechanism for pivotally mounting a mirror mounting arm carrying the mirror to the mirror mounting bracket, a first connection area, and a second connection area;
   a top support bracket having a third connection area configured to connect said top support bracket to a top side of a structural portion of the vehicle, and a fourth connection area configured to connect to the first connection area of said mounting bracket;
   a back support bracket comprising a fifth connection area at least a portion of which is configured to be positioned in an interior section of at least one of the vehicle, a vehicle body or a body panel, wherein the back support bracket is configured to connect to at least one of said top support bracket and the top side of the structural portion of the vehicle, and a sixth connection area of the back support bracket configured to connect to said mounting bracket; and
   at least one connection device configured to connect said second connection area of said mounting bracket to said sixth connection area of said back support bracket, wherein the at least one connection device is at least one of: beneath the structural portion of the vehicle, supported by the structural portion of the vehicle, and through the structural portion of the vehicle.

2. The mirror mounting assembly of claim 1, wherein the third connection area of the top support bracket has a substantially elongated shape, a proximal end and a distal end, and wherein the third connection area comprises a proximal end aperture and a distal end aperture.

3. The mirror mounting assembly of claim 2, wherein the proximal end aperture and the distal end aperture are appropriately spaced to generally align with and be fastenable to existing fasteners on the top side of the structural portion of the vehicle.

4. The mirror mounting assembly of claim 1, wherein the mounting bracket, the top support bracket, and the back support bracket are adapted to fasten substantially around a portion of the frame of the vehicle.

5. The mirror mounting assembly of claim 1, further comprising at least one fastener for connecting the first connection area to the fourth connection area.

6. The mirror mounting assembly of claim 1, wherein said sixth connection area comprises at least one aperture for receiving the at least one connection device from the mounting bracket.

7. A mirror mounting assembly for mounting a mirror to a vehicle, comprising:
   a mounting bracket including a mirror pivot mechanism for pivotally mounting a mirror mounting arm carrying the mirror to the mirror mounting bracket, a first connection area, and a second connection area;
   a top support bracket having a third connection area configured to connect said top support bracket to a top side of a structural portion of the vehicle, and a fourth connection area configured to connect to the first connection area of said mounting bracket;
   a back support bracket comprising a fifth connection area at least a portion of which is configured to be positioned in an interior section of at least one of the vehicle, a vehicle body or a body panel, wherein the back support bracket is configured to connect to at least one of said top support bracket and the top side of the structural portion of the vehicle, and a sixth connection area of the back support bracket configured to connect to said mounting bracket;
   at least one connection device configured to connect said second connection area of said mounting bracket to said sixth connection area of said back support bracket, wherein the at least one connection device is at least one of: beneath the structural portion of the vehicle, supported by the structural portion of the vehicle, and through the structural portion of the vehicle; and, wherein the mounting bracket further comprises a front portion, a left side wall, a right side wall, a top wall, and a bottom wall, wherein the front portion, side walls, top wall and bottom wall together form a concave back portion, and wherein the concave back portion is generally shaped to the contour of a portion of a fender of the vehicle.

8. The mirror mounting assembly of claim 7, wherein the top wall of the mounting bracket comprises the first connection area, and wherein the front portion comprises the mirror pivot mechanism.

9. The mirror mounting assembly of claim 7, wherein the fourth connection area comprises a substantially z-shaped flange extending from a side of the third connection area in a direction of an outer side of the structural portion of the vehicle, wherein the z-shaped flange is positioned and configured so as to be insertable into the back portion of the mounting bracket and wherein the fourth connection area is fastenable to an underside of the top wall at the first connection area.

10. The mirror mounting assembly of claim 7, wherein the mounting bracket comprises a substantially right-angled trapezoidal shape, and wherein the bottom wall of said mounting bracket substantially conforms to a wheelbase of the fender of the vehicle.

11. The mirror mounting assembly of claim 7, further comprising at least one support shaft sufficient length to be placed at least one of:
  (1) between the mounting bracket and the back support bracket; and
  (2) between the mounting bracket and a side of the structural portion of the vehicle;
  (3) wherein the at least one connection device passes through the at least one support shaft, and
  (4) wherein the at least one support shaft supports the at least one connection device and the mirror mounting assembly.

12. The mirror mounting assembly of claim 7, wherein the front portion further comprises at least one depression, and wherein the second connection area is located in the depression.

13. The mirror mounting assembly of claim 12, wherein the at least one depression is located along at least one of the left side wall and the right side wall, and wherein the depression forms an indentation in the at least one of the left side wall and the right side wall.

14. The mirror mounting assembly of claim 12, wherein the at least one depression extends substantially to the back portion of the mounting bracket.

15. A mirror mounting assembly for mounting a mirror to a vehicle, comprising:
  a mounting bracket including a mirror pivot mechanism for pivotally mounting a mirror mounting arm carrying the mirror to the mirror mounting bracket, a first connection area, and a second connection area;
  a top support bracket having a third connection area configured to connect said top support bracket to a top side of a structural portion of the vehicle, and a fourth connection area configured to connect to the first connection area of said mounting bracket;
  a back support bracket comprising a fifth connection area at least a portion of which is configured to be positioned in an interior section of at least one of the vehicle, a vehicle body or a body panel, wherein the back support bracket is configured to connect to at least one of said top support bracket and the top side of the structural portion of the vehicle, and a sixth connection area of the back support bracket configured to connect to said mounting bracket;
  at least one connection device configured to connect said second connection area of said mounting bracket to said sixth connection area of said back support bracket, wherein the at least one connection device is at least one of: beneath the structural portion of the vehicle, supported by the structural portion of the vehicle, and through the structural portion of the vehicle; and,
  wherein the back support bracket comprises a top section extending substantially horizontally and a back section extending downward from the top section, the top section and back section appearing as a substantially inverted L-shape, wherein the fifth connection area of the back support bracket comprises the top section that is positioned to be alignable and fastenable with at least one of the third connection area of the top support bracket and another location along the top side of the structural portion of the vehicle, and
  wherein the sixth connection area of the back support bracket comprises the back section that extends downward from the top section, along an inner side of the structural portion of the vehicle, for the at least one connection device to connect the second connection area of the mounting bracket to the sixth connection area of the back support bracket.

16. The mirror mounting assembly of claim 15, wherein the third connection area of the top support bracket has a substantially elongated shape, a proximal end and a distal end, and wherein the third connection area comprises a proximal end aperture and a distal end aperture.

17. The mirror mounting assembly of claim 16, wherein the proximal end aperture and the distal end aperture are appropriately spaced to generally align with and be fastenable to existing fasteners on the top side of the structural portion of the vehicle.

18. The mirror mounting assembly of claim 15, wherein the mounting bracket, the top support bracket, and the back support bracket are adapted to fasten substantially around a portion of the frame of the vehicle.

19. The mirror mounting assembly of claim 15, further comprising at least one fastener for connecting the first connection area to the fourth connection area.

20. The mirror mounting assembly of claim 15, wherein said sixth connection area comprises at least one aperture for receiving the at least one connection device from the mounting bracket.

21. A mirror mounting assembly for mounting a mirror to a vehicle, comprising:
  a mounting bracket including a mirror pivot mechanism for pivotally mounting a mirror mounting arm carrying the mirror to the mirror mounting bracket, a first connection area, and a second connection area;
  a top support bracket having a third connection area configured to connect said top support bracket to a top side of a structural portion of the vehicle, and a fourth connection area configured to connect to the first connection area of said mounting bracket;
  a back support bracket comprising a fifth connection area at least a portion of which is configured to be positioned in an interior section of at least one of the vehicle, a vehicle body or a body panel, wherein the back support bracket is configured to connect to at least one of said top support bracket and the top side of the structural portion of the vehicle, and a sixth connection area of the back support bracket configured to connect to said mounting bracket;

at least one connection device configured to connect said second connection area of said mounting bracket to said sixth connection area of said back support bracket, wherein the at least one connection device is at least one of: beneath the structural portion of the vehicle, supported by the structural portion of the vehicle, and through the structural portion of the vehicle; and, wherein the top support bracket and the back support bracket are at least one of integral, welded and permanently connected to form one contiguous support bracket.

22. The mirror mounting assembly of claim 21, wherein the third connection area of the top support bracket has a substantially elongated shape, a proximal end and a distal end, and wherein the third connection area comprises a proximal end aperture and a distal end aperture.

23. The mirror mounting assembly of claim 22, wherein the proximal end aperture and the distal end aperture are appropriately spaced to generally align with and be fastenable to existing fasteners on the top side of the structural portion of the vehicle.

24. The mirror mounting assembly of claim 21, wherein the mounting bracket, the top support bracket, and the back support bracket are adapted to fasten substantially around a portion of the frame of the vehicle.

25. The mirror mounting assembly of claim 21, further comprising at least one fastener for connecting the first connection area to the fourth connection area.

26. The mirror mounting assembly of claim 21, wherein said sixth connection area comprises at least one aperture for receiving the at least one connection device from the mounting bracket.

27. A mirror mounting assembly for mounting a mirror to a vehicle, comprising:

a mounting bracket including a mirror pivot mechanism for pivotally mounting a mirror mounting arm carrying the mirror to the mirror mounting bracket, a first connection area, and a second connection area;

a top support bracket having a third connection area configured to connect said top support bracket to a top side of a structural portion of the vehicle, and a fourth connection area configured to connect to the first connection area of said mounting bracket;

a back support bracket comprising a fifth connection area at least a portion of which is configured to be positioned in an interior section of at least one of the vehicle, a vehicle body or a body panel, wherein the back support bracket is configured to connect to at least one of said top support bracket and the top side of the structural portion of the vehicle, and a sixth connection area of the back support bracket configured to connect to said mounting bracket; and at least one connection device configured to connect said second connection area to said sixth connection area, wherein the at least one connection device is at least one of: beneath the structural portion of the vehicle, supported by the structural portion of the vehicle, and through the structural portion of the vehicle, wherein the mounting bracket further comprises a front portion, a left side wall, a right side wall, a top wall, and a bottom wall, wherein the front portion, side walls, top wall and bottom wall together form a concave back portion, and wherein the concave back portion is generally shaped to the contour of a portion of a fender of the vehicle.

28. The mirror mounting assembly of claim 27, wherein the top wall of the mounting bracket comprises the first connection area, and wherein the front portion comprises the mirror pivot mechanism.

29. The mirror mounting assembly of claim 27, further comprising at least one fastener for connecting the first connection area to the fourth connection area.

30. The mirror mounting assembly of claim 27, wherein the mounting bracket, the top support bracket, and the back support bracket are adapted to fasten substantially around a portion of the frame of the vehicle.

\* \* \* \* \*